United States Patent [19]
Data

[11] Patent Number: 5,370,551
[45] Date of Patent: Dec. 6, 1994

[54] ELECTRICAL RECEPTACLE ASSEMBLY

[75] Inventor: Mark M. Data, Bolingbrook, Ill.

[73] Assignee: Molex Incorporated, Lisle, Ill.

[21] Appl. No.: 179,005

[22] Filed: Jan. 7, 1994

[51] Int. Cl.[5] ............................................. H02G 3/08
[52] U.S. Cl. .................................... 439/487; 220/3.8; 220/307
[58] Field of Search .................. 174/50, 53, 58, 65 R; 220/3.8, 306, 307; 439/535, 487

[56] References Cited

U.S. PATENT DOCUMENTS

| 3,149,747 | 9/1964 | Burgess | 220/306 |
| 4,531,794 | 7/1985 | Heverly | 439/147 |
| 4,872,087 | 10/1989 | Brant | 361/356 |
| 5,274,194 | 12/1993 | Belcher | 174/50 |

FOREIGN PATENT DOCUMENTS 2233509A 1/1991 United Kingdom .

Primary Examiner—Neil Abrams
Attorney, Agent, or Firm—Stephen Z. Weiss

[57] ABSTRACT

An electrical plug-receiving receptacle includes a housing enclosure with an opening and a cover for closing the opening. The housing enclosure has walls defining at least a portion of the periphery of the opening, including an outside wall and a generally flexible inside wall spaced from the outside wall. The inside wall has an aperture spaced from the opening. The cover includes a generally rigid inner arm for positioning inside the flexible inside wall of the housing enclosure and a generally rigid outer arm for positioning between the inside and the outside walls of the enclosure. The inner and outer arms define a tortous passage therebetween for insertion thereinto of the inside wall of the housing enclosure. The inner arm has a latching nib for latching engagement in the aperture in the inside wall of the enclosure. The inside wall must bend when inserted into the tortuous passage. The cover may include a heat sink.

13 Claims, 5 Drawing Sheets

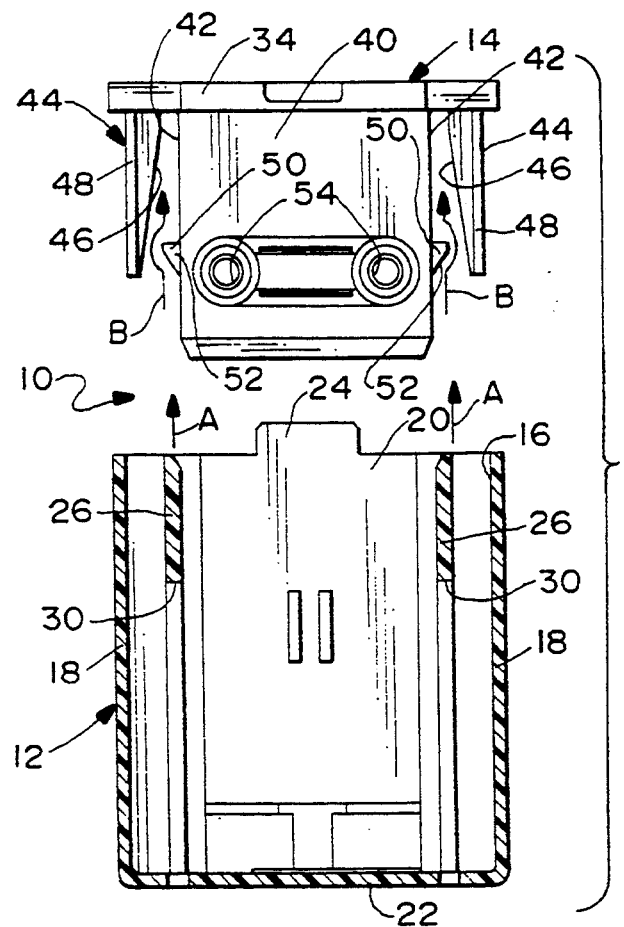
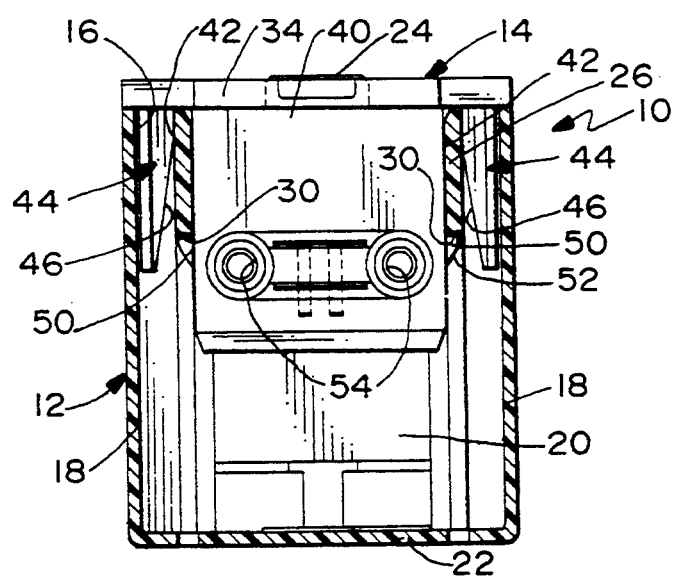
FIG.2
FIG.3
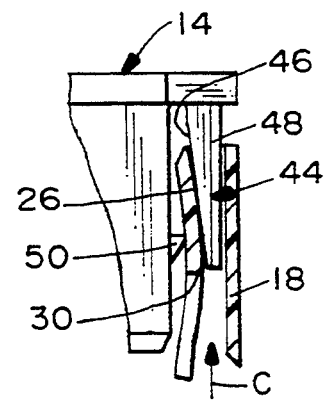
FIG.4

5,370,551

ELECTRICAL RECEPTACLE ASSEMBLY

FIELD OF THE INVENTION

This invention generally relates to the art of electrical connectors and, particularly, to an electrical plug-receiving receptacle assembly.

BACKGROUND OF THE INVENTION

Electrical receptacles for accepting the prongs of electrical plugs to connect an electrical line to a source of electrical power have been designed as self-contained units or for mounting in junction boxes. Electrical terminals or contacts to which incoming power, neutral and grounding wires are connected, as well as other receptacle components, normally are enclosed within a housing means, such as a two-part assembly to form a protective enclosure for the components. The two housing parts may be maintained in assembled relationship by means of screws or other such fasteners installed as part of the assembly operation. Such screws may be easily removed, of course, permitting disassembly of the receptacle by end users of the receptacles.

In efforts to eliminate such extraneous items as screws or other fastening components, two-part receptacle assemblies have been designed with integral latch means to permit assembly in a more rapid and efficient manner. Such latching systems most often are used when the two-part housing assembly is fabricated of plastic material, i.e. each part is unitarily molded of plastic.

One of the problems in providing latching systems in electrical receptacles with multi-part plastic housing enclosures is that the walls of the enclosures often are thin and rather flexible. If latching devices are provided on flexible walls, for instance, it may be difficult to provide a reliable latching system, particularly if it is desirous to make it difficult to disassemble the receptacle or to make disassembly substantially impossible without destroying the receptacle. Consequently, with thin-walled constructions, the walls must be thickened in areas where the latching devices are provided, or extraneous latching protuberances have been provided, projecting outwardly of the housing enclosure, as was done in U.S. Pat. No. 4,872,087 to Brant, dated Oct. 3, 1989.

The present invention is directed to solving such problems as identified above with providing a latching system in flexible and/or thin walled receptacle housing enclosures, without providing outwardly protruding latch devices and without having to thicken the walls of the receptacle to provide an adequate latching system.

SUMMARY OF THE INVENTION

An object, therefore, of the invention is to provide a new and improved electrical receptacle of the character described.

In the exemplary embodiment of the invention, an electrical receptacle is disclosed to include a housing enclosure with an opening and cover means for generally closing at least a portion of the opening. The housing enclosure has a generally thin flexible wall with an aperture spaced inwardly of the opening. The cover means includes a generally rigid inner arm for positioning inside the flexible wall of the housing enclosure and a generally rigid outer arm for positioning outside the flexible wall. The inner and outer arms define a tortuous passage therebetween for insertion thereinto of the flexible wall such that the flexible wall must bend when inserted into the tortuous passage. Complementary interengaging latch means are provided between the flexible wall and the inner arm for latching the cover means to the housing enclosure when the flexible wall is inserted into the tortuous passage.

As disclosed herein, the aforementioned thin flexible wall is provided as an inside wall spaced inwardly from an outside flexible wall of the housing enclosure. The outside wall defines at least a portion of the periphery of the opening in the housing enclosure, and the outside wall is disposed outside the outer arm of the cover means, whereby the latch means is located entirely within the enclosure and does not protrude outwardly therefrom.

In one embodiment of the invention, the cover means is a one-piece structure and includes a generally planar closing wall, with the inner and outer arms projecting therefrom into the opening in the housing enclosure. The latch means is provided by an aperture in the flexible inside wall of the housing enclosure and a latching nib on the rigid inner arm of the cover means. The outer arm of the cover means has a ramped inside surface which effectively narrows the tortuous passage on one side of the latching nib to a dimension narrower than that of the flexible inside wall of the housing enclosure to force the inside wall to bend around the latching nib when inserted into the passage. The latching nib has a chamfered surface engageable by the inside wall when inserted into the passage to facilitate bending of the inside wall around the latching nib.

In an alternative embodiment of the invention, the cover means include a heat sink means. In particular, the cover means is a two-part structure including a frame part having the generally rigid inner arm thereon and a heat sink part having the generally rigid outer arm and the heat sink means thereon.

Complementary interengaging abutment means also are provided between the inside wall of the housing enclosure and the inner arm of the cover means to prevent lateral movement between the enclosure and the cover means. The abutment means are provided by a flange on the inside wall extending generally parallel to the passage and engageable by the inner arm of the cover means.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

FIG. 2 is an end elevational view of the cover means and a vertical section through the housing enclosure taken generally along line 2—2 of FIG. 1, with the cover means and the housing enclosure in disassembled condition;

FIG. 3 is a view similar to that of FIG. 2, with the cover means and housing enclosure assembled;

FIG. 4 is a fragmented view of the latch means in partially latched condition;

DETAILED DESCRIPTION OF THE PREFERRED EMBODIMENTS

Figure 1:
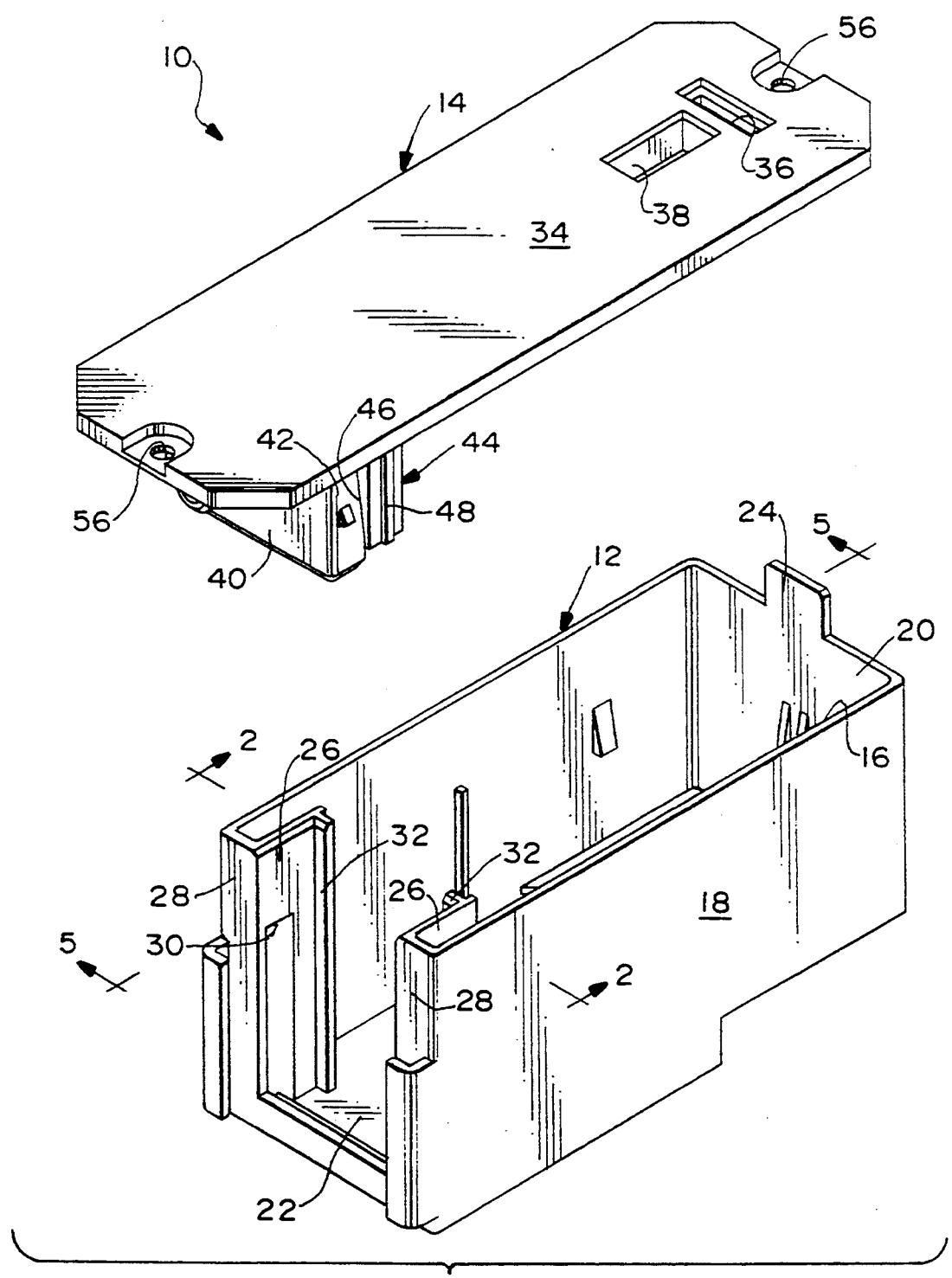
FIG. 1 is a perspective view of the housing enclosure and the cover means of one embodiment of the electrical receptacle of the invention, in disassembled condition.
Figure 6:
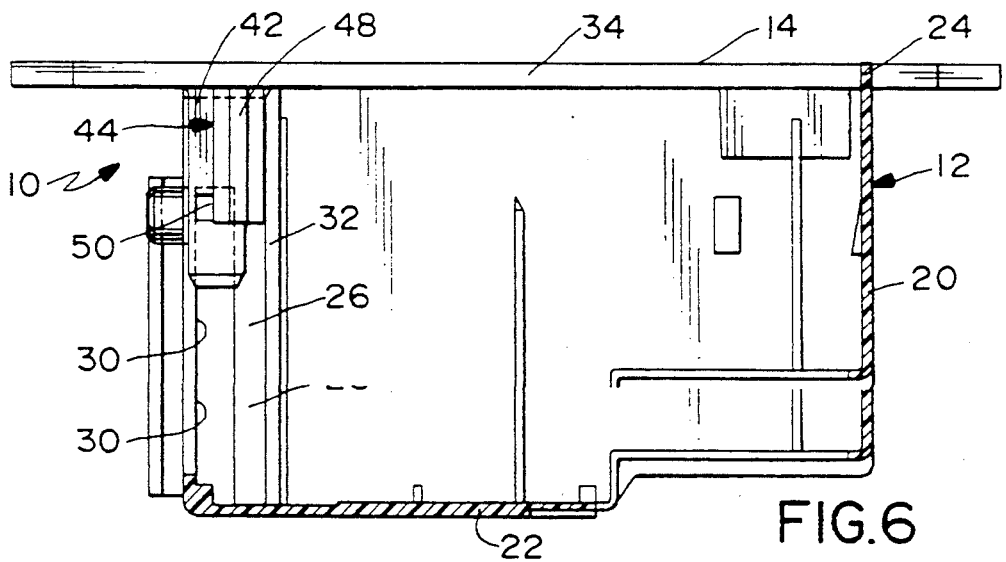
FIG. 6 is a view similar to that of FIG. 5, with the cover means and the housing enclosure assembled.
Figure 7:
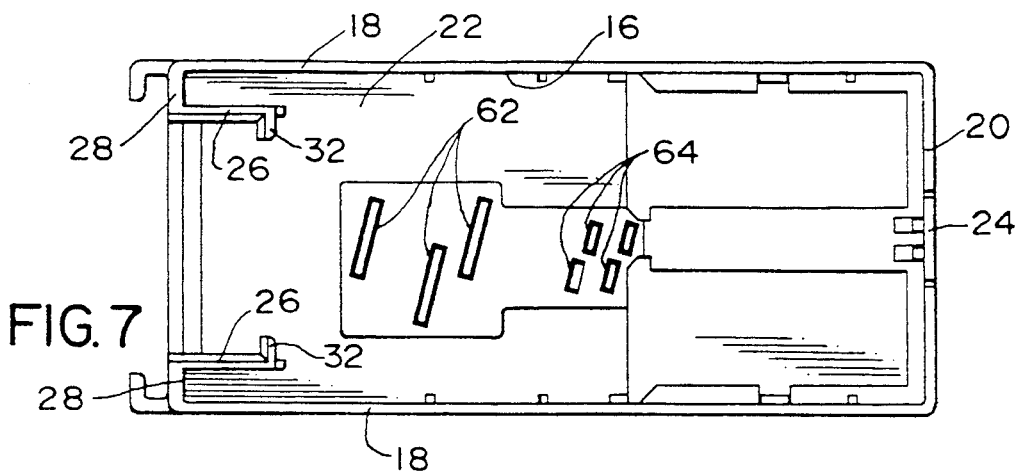
FIG. 7 is a top plan view of the housing enclosure.
Figure 8:
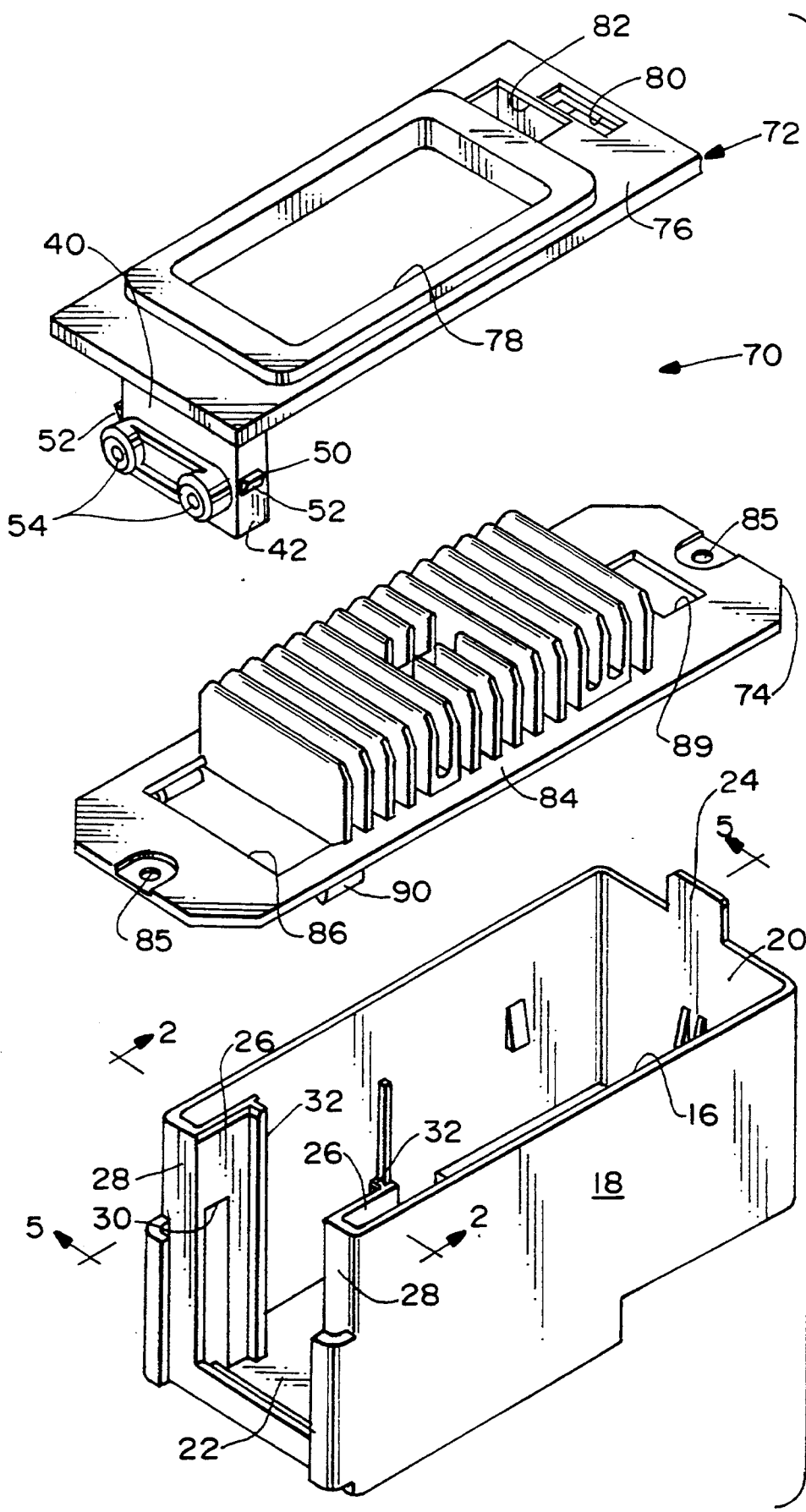
FIG. 8 is an exploded perspective view of an alternate embodiment of the invention.
Figures 9, 10:
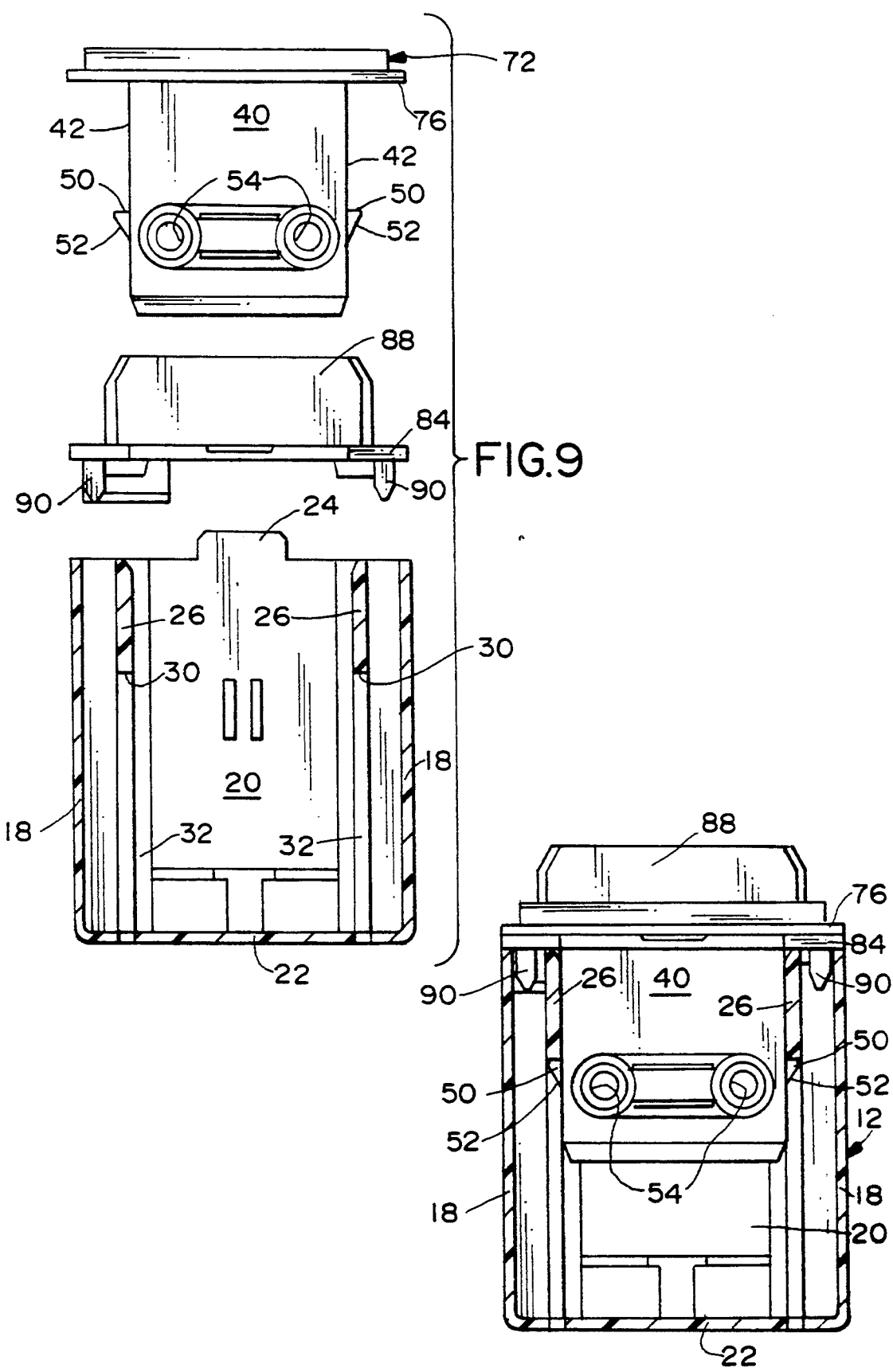
FIG. 9 is a view similar to that of FIG. 2, but of the alternative embodiment.
FIG. 10 is a view similar to that of FIG. 3 but of the alternative embodiment.

Referring to the drawings in greater detail, FIGS. 1-7 show one embodiment of the invention, and FIGS. 8-10 show an alternate embodiment of the invention. Referring first to FIG. 1, an electrical plug-receiving receptacle, generally designated 10, includes a housing enclosure, generally designated 12, and a cover means in the form of a one-piece cover, generally designated 14. The housing enclosure defines an opening 16, and the cover is adapted for closing this opening. It should be understood that receptacle 10 is intended to house or enclose terminals or contacts to which incoming power, neutral and grounding wires are connected, as well as other receptacle components. The terminals and the other components, etc. are not shown in the drawings, because they are well known in the art and their depiction would unduly clutter the figures.

Housing enclosure 12 is unitarily molded of dielectric material such as plastic or the like and includes wall means defining a substantial portion of the periphery of opening 16. The wall means include outside side walls 18 and an end wall 20 bounding three sides of opening 16, along with a bottom wall 22 which closes the bottom of the opening. A tab 24 projects upwardly from the upper edge of rear wall 20. It can be seen that side walls 18 are relatively thin and, being fabricated of plastic material, the side walls are considerably flexible and not amenable to providing reliable latching devices thereon.

Housing enclosure 12 further includes a pair of generally flexible inside walls 26 which are spaced inwardly from outside side walls 18 near the front edges thereof. Front wall portions 28 join inside walls 26 with outside walls 18 in generally U-shaped configurations. Each flexible inside wall 26 includes a latching aperture 30 spaced from opening 16, and a vertical flange 32 which projects inwardly from the respective inside wall.

Referring to FIG. 2 in conjunction with FIG. 1, cover 14 is a one-piece structure and includes a generally planar closing wall 34 having a slot 36 through which tab 24 of housing enclosure 12 projects. A hole 38 is formed in the cover adjacent slot 36, and this hole is provided as a port through which a probe of a testing or recording unit can be inserted. The cover also has a front wall 40 which is inserted between flexible inside walls 26 of housing enclosure 12. Cover 14, like housing enclosure 12, is unitarily molded of dielectric material such as plastic or the like.

Front wall 40 is rigid and the sides thereof define inner arms 42 for positioning inside flexible inside walls 26 of the housing enclosure. A generally rigid outer arm, generally designated 44, depends from planar wall 34 of cover 14 for positioning between each inside flexible wall 26 and the respective outside flexible wall 18 of the housing enclosure. As best seen in FIG. 2, a ramped surface 46 is formed on the inside of each outer arm 44. As best seen in FIG. 1, a stiffening or rigidifying rib 48 is formed on the outside of each arm 44. A latching nib 50 projects outwardly from each inner arm 42, and each nib includes a chamfered bottom surface 52. As seen in FIG. 2, front wall 40 has a pair of holes 54 which are provided as screw holes for accepting a strain relief plate (not shown) of the receptacle assembly. Lastly, the top of the cover also has a pair of holes 56 (FIG. 1) for mounting the entire receptacle to an appropriate supporting surface means (not shown).

It should be understood that inner "arms" 42 are provided by the sides of front wall 40 of cover 14, because the invention is illustrated in the particular embodiment of a receptacle assembly which includes the front wall. However, it should be understood that separate inner rigid arms could be provided spaced inwardly of outer rigid arms 44 to define passages therebetween into which flexible inner walls 26 of housing enclosure 12 can be inserted in the direction of arrows "A" (FIG. 2).

More particularly, the invention contemplates that inner rigid arms 42 and outer rigid arms 44 of cover 14 define tortuous passages as indicated by arrows "B" (FIG. 2). The arrows are shown to curve around latching nibs 50 and upwardly between the inner and outer arms along ramped inside surfaces 46 of the outer arms. It also can be seen that the ramped surfaces 52 effectively narrow the passages on the upper sides of latching nibs 50 if the passages were considered to be in straight lines. Therefore, reference is made to FIG. 4 which shows how inner flexible arms 26 must bend when inserted into the tortuous passages between the inner and outer arms 42 and 44, respectively, as the passages are defined by latching nibs 50 and ramped inside surfaces 46.

In comparing FIGS. 3 and 4, as flexible inside walls 26 move into the passages between the inner and outer arms of the cover in the direction of arrow "C" (FIG. 4), the flexible walls eventually reach positions as shown in FIG. 3 whereupon apertures 30 in the flexible inside walls 26 of the housing enclosure snap about latching nibs 50. It can be seen that the flexible inside walls 26, in their latching condition as shown in FIG. 3, are generally planar as in their original unstressed condition as shown in FIGS. 1 and 2. In the fully latched condition of receptacle 10, with cover 14 latched onto the top of housing enclosure 12 as shown in FIG. 3, the receptacle cannot be disassembled or opened without substantially or completely destroying the structure.

Figure 5:
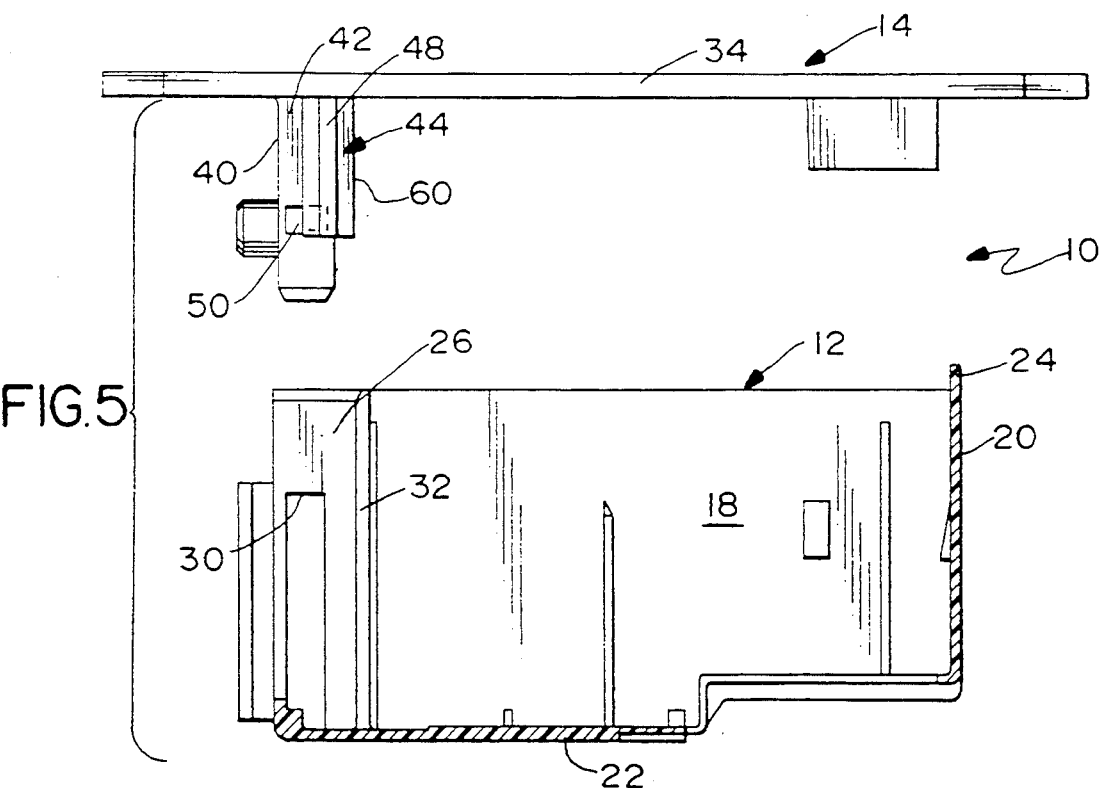
FIG. 5 is a side elevational view of the cover means and a vertical section of the housing enclosure taken generally along line 5—5 of FIG. 1, with the cover means and housing enclosure in disassembled condition.

FIGS. 5 and 6 show another feature of the invention wherein the inwardly directed flange 32 of each inside flexible wall 26 of housing enclosure 12 is located laterally of an inside edge 60 of the respective outer arm 44 of the cover. Therefore, when the cover is assembled to the housing enclosure as shown in FIG. 6, the outer arms 44 abut against flanges 32 to prevent lateral movement between the cover and the housing enclosure.

FIGS. 5 and 6 also show that flexible inside walls 26 of housing enclosure 12, along with generally rigid outer arms 44 of cover 14 extend inwardly of latching nibs 50 in a lateral direction, i.e. to the right as viewed in FIGS. 5 and 6. Therefore, not only must the flexible inside walls 26 bend around latching nibs 50 as shown in FIG. 4, but the flexible walls also twist about the latching nibs (i.e. about vertical axes) at the inside edges of the nibs during assembly.

FIG. 7 shows the full bottom wall 22 of housing enclosure 12 to better illustrate the location of inside flexible walls 26 in relation to outside flexible walls 18. In addition, a plurality of slots 62 and 64 are shown in the bottom walls. These slots are for insertion therethrough of the prongs of an appropriate electrical plug (not shown).

FIGS. 8-10 show an alternative embodiment of the invention wherein the cover means is in the form of a two-part structure including a heat sink means. In other words, the electrical plug-receiving receptacle of the invention may be used in an application wherein a dimmer block may be employed in the circuitry within the housing enclosure. The dimmer block generates heat, and a heat sink means is employed to dissipate the heat.

More particularly, in the embodiment of FIGS. 8-10, a cover means, generally designated 70, is employed in conjunction with a housing enclosure identical to housing enclosure 12 described above in relation to the embodiment of FIGS. 1-7. Therefore, like numerals have been applied to the components of housing enclosure 12 corresponding to like components described above, and the description of the housing enclosure will not be repeated.

Referring to FIGS. 8-10 in particular, cover means 70 is a two-part structure including a frame part, generally designated 72, and a heat sink part, generally designated 74. In essence, frame part 72 includes a generally planar wall 76, similar to closing wall 34 of cover 14, but including a rather large opening 78. The planar wall includes a slot 80 through which tab 24 of housing enclosure 12 projects, along with a hole 82 provided as a port through which a probe of a testing or recording unit can be inserted. Frame part 72 includes a rigid front wall 40, with the sides thereof defining inner arms 42 having a latching nib 50 projecting outwardly from each inner arm, and each nib including a chamfered bottom surface 52. These reference numerals correspond to the above description of the front wall, inner arms and latching nibs of the embodiment in FIGS. 1-7. In addition, front wall 40 again has a pair of holes 54 which are provided as screw holes for accepting a strain relief plate (not shown) of the receptacle assembly.

Heat sink part 74 includes a generally rectangular peripheral wall 84 which underlies planar wall 76 of frame part 72 when in assembled condition as shown in FIG. 10. Peripheral wall 84 includes a pair of holes 85 (FIG. 8) for mounting the entire receptacle to an appropriate supporting surface means (not shown). Heat sink part 74 includes a plurality of heat-dissipating fins 88 which are secured to or integral with peripheral wall 40 in a generally parallel, spaced relationship with each other. The array of heat-dissipating fins project upwardly through opening 78 in frame part 72 when cover means 70 is in assembled condition as shown in FIG. 10. Front wall 40 of frame part 72 projects downwardly through an opening 86 in heat sink part 74. Lastly, the heat sink part has an opening 89 aligned with hole 82 in the frame part and through which tab 24 of housing enclosure 12 projects. Either the entire heat sink part 74, or at least the heat-dissipating fins thereof, are fabricated of a heat conductive material to conduct and dissipate to atmosphere heat generated from electrical components within housing enclosure 12, such as a dimmer block, as described above.

Whereas generally rigid outer arm 44 in the embodiment of FIGS. 1-7 is formed integrally with and depends from planar wall 34 of cover 14, in the alternative embodiment of FIGS. 8-10, a pair of generally rigid outer arms 90 project downwardly from peripheral wall 84 for positioning between each inside flexible wall 26 and the respective outside flexible wall 18 of housing enclosure 12, as best seen in FIG. 10. Other than the fact that cover means 70 in the embodiment of FIGS. 8-10 is a two-part structure to include a heat sink means, the function and operation of assembling the plug-receiving receptacle, including inner arms 42 and latching nibs 52 on frame part 72, along with rigid outer arms 90 on heat sink part 74, in conjunction with outside and inside flexible walls 18 and 26, respectively, of the housing disclosure are substantially the same and will not be repeated herein.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. In an electrical plug-receiving receptacle including a housing enclosure with an opening and cover means for generally closing at least a portion of the opening,
    said housing enclosure having wall means defining at least a portion of the periphery of said opening, the wall means including an outside wall and a generally flexible inside wall spaced from the outside wall, the inside wall having an aperture spaced from the opening, and
    said cover means including a generally rigid inner arm for positioning inside the flexible inside wall of the housing enclosure and a generally rigid outer arm for positioning between the inside and the outside walls of the enclosure, the inner and outer arms thereby defining a passage therebetween for insertion thereinto of the inside wall of the housing enclosure, and the inner arm having a latching nib for latching engagement in the aperture in the inside wall of the enclosure.

2. In an electrical plug-receiving receptacle as set forth in claim 1, wherein said cover means comprises a one-piece cover member having a generally planar closing wall with said inner and outer arms projecting therefrom into the opening in the housing enclosure.

3. In an electrical plug-receiving receptacle as set forth in claim 1, wherein said inner and outer arms are configured relative to each other to define a tortuous path for said passage between the arms whereby said inside wall must bend when inserted thereinto.

4. In an electrical plug-receiving receptacle as set forth in claim 3, wherein said outer arm has a ramped inside surface which effectively narrows said passage on one side of the latching nib to a dimension narrower than that of said inside wall to force the inside wall to bend around the latching nib when inserted into the passage.

5. In an electrical plug-receiving receptacle as set forth in claim 4, wherein said latching nib has a chamfered surface engageable by said inside wall when inserted into said passage to facilitate bending of the inside wall around the latching nib.

6. In an electrical plug-receiving receptacle as set forth in claim 1, including complementary interengaging abutment means between the inside wall of the housing enclosure and a front wall portion of the inner arm of the cover means to prevent lateral movement between the enclosure and the cover means.

7. In an electrical plug-receiving receptacle as set forth in claim 6, wherein said abutment means comprises a flange on said inside wall extending generally parallel to the passage and engageable by the front wall portion of inner arm of the cover means.

8. In an electrical plug-receiving receptacle as set forth in claim 1 wherein said cover means include heat sink means.

9. In an electrical plug-receiving receptacle as set forth in claim 8 wherein said cover means comprises a two-part structure including a frame part having said generally rigid inner arm thereon and a heat sink part having said generally rigid outer arm and said heat sink means thereon.

10. In an electrical receptacle including a housing enclosure with an opening and cover means for generally closing at least a portion of the opening, said housing enclosure having a generally thin flexible wall, said cover means being a two-part structure including a frame part and a heat sink part, the frame part including a generally rigid inner arm for positioning inside the flexible wall of the housing enclosure, and the heat sink part including a generally rigid outer arm for positioning outside the flexible wall, and complementary interengaging latch means between the flexible wall and one of the inner and outer arms for latching the cover means to the housing enclosure.

11. In an electrical receptacle including a housing enclosure with an opening and cover means for generally closing at least a portion of the opening, said housing enclosure having a generally thin flexible wall, said cover means including a generally rigid inner arm for positioning inside the flexible wall of the housing enclosure and a generally rigid outer arm for positioning outside the flexible wall, the inner and outer arms defining a tortuous passage therebetween for insertion thereinto of the flexible wall such that the flexible wall must bend when inserted into the tortuous passage, complementary interengaging latch means between the flexible wall and the inner arm for latching the cover means to the housing enclosure when the flexible wall is inserted into the tortuous passage, said complementary interengaging latch means including a latching nib on the generally rigid inner arm projecting into the passage for engagement in an aperture in the flexible wall, and complementary interengaging abutment means between the thin flexible wall of the housing enclosure and the inner arm of the cover means to prevent lateral movement between the enclosure and the cover means, said abutment means including a flange on said thin flexible wall extending generally parallel to the passage and engagable by the front wall portion of the inner arm of the cover means.

12. In an electrical plug-receiving receptacle as set forth in claim 11 wherein said cover means include heat sink means.

13. In an electrical receptacle including a housing enclosure with an opening and cover means for generally closing at least a portion of the opening, said housing enclosure having a generally thin flexible wall, said cover means including a generally rigid inner arm for positioning inside the flexible wall of the housing enclosure and a generally rigid outer arm for positioning outside the flexible wall, the inner and outer arms defining a tortuous passage therebetween for insertion thereinto of the flexible wall such that the flexible wall must bend when inserted into the tortuous passage, and said cover means including a two-part structure including a frame part having said generally rigid inner arm thereon and a heat sink part having said generally rigid outer arm and said heat sink means thereon.

* * * * *